INVENTOR
Tom Kilburn
David Beverley George Edwards
BY
Cushman, Darby & Cushman
ATTORNEY INVENTOR
Tom Kilburn
BY David Beverley George Edwards
Cushman, Darby & Cushman
ATTORNEY INVENTOR
Tom Kilburn
David Beverley George Edwards
BY
Cushman, Darby + Cushman
ATTORNEY INVENTOR
Tom Kilburn
David Beverley George Edwards
BY
Cushman, Darby & Cushman
ATTORNEY INVENTOR
Tom Kilburn
David Beverley George Edwards
BY
Cushman, Darby & Cushman
ATTORNEY Sept. 21, 1965 T. KILBURN ETAL 3,208,048

ELECTRONIC DIGITAL COMPUTING MACHINES WITH PRIORITY INTERRUPT FEATURE

Filed June 27, 1961 6 Sheets-Sheet 6

INVENTOR
Tom Kilburn
David Beverley George Edwards
BY
Cushman, Darby & Cushman
ATTORNEY United States Patent Office 3,208,048

Patented Sept. 21, 1965

3,208,048

ELECTRONIC DIGITAL COMPUTING MACHINES WITH PRIORITY INTERRUPT FEATURE

Tom Kilburn, Urmston, and David Beverley George Edwards, Chorlton-cum-Hardy, Manchester, England, assignors, by mesne assignments, to International Business Machines Corporation, New York, N.Y., a corporation of New York Filed June 27, 1961, Ser. No. 119,858
Claims priority, application Great Britain, June 30, 1960, 23,017/60
7 Claims. (Cl. 340—172.5)

This invention relates to electronic digital computing machines and is more particularly concerned with improved control arrangements permitting more efficient employment of machine operating time, particularly in respect of time sharing between different order programmes and the operation of subsidiary or peripheral equipment such as backing storage means, input and output mechanism and other devices which may operate at a signalling speed and/or access time which is not the same as and which may be much slower than the signalling speed or access time of the main data storage means and the associated computing circuits of the machine.

One aspect of the invention relates to the provision of one or more subsidiary control systems each associated with a predetermined programme of instructions for dealing with lower priority order programmes or the various operations to be performed with the subsidiary or peripheral equipment and means for interrupting the normal operation of the machine whilst under the control of the normal control system and effecting transfer of machine control to such subsidiary control system or to a particular one of such subsidiary control systems if there is more than one, at time instants when such subsidiary or peripheral equipment requires access to any part of the machine which is directly associated with the normal control systems and the order programme operative in such control system.

For example, subsidiary data storage means such as a magnetic tape deck whose access time is long and whose signalling speed may be low compared with the main data store, can proceed with its operation cycle to find a required storage address and the writing-in or reading-out of stored data from or into an associated register simultaneously with a period of normal computing or other operation of the machine under the control of the main or another, subsidiary, control system until an instant when such low speed writing-in or reading-out operation is completed and access is required to the main data store in order to obtain further data to be written into the subsidiary store or to supply the read-out data to the main data store. At this instant or as soon thereafter as a current order already in the main control system has been completed, transfer of machine control from the normal main control system to subsidiary control is effected to provide the required access whereafter machine control reverts to the main control system.

A considerable number of different subsidiary or peripheral equipment elements may be arranged for simultaneous but independent operation together with normal machine operation and each arranged to demand access to the main machine circuits as and when needed, each subsidiary or peripheral equipment element being accorded a degree of priority in the programme or programmes of the subsidiary control system or systems for obtaining the required access compatible with the period of time which such equipment element can wait without interference with its own operation.

A further feature of the invention relates to the adaptation of such basic arrangement for use when the subsidiary storage is divided into two or even more levels, such levels having usually progressively larger word capacity but relatively slower access speed and signalling time. In accordance with this further feature each successive transfer stage between successive storage levels is provided with its own individual subsidiary control system itself pre-arranged to operate through a given sequence of orders specially adapted to carry out the particular sub-routine assigned to such control system. In such an arrangement, a particular total time period is assigned to the operation of each of such subsidiary control systems and this period is made rather more than is necessary to carry out the whole of the sequence of instructions of the particular sub-routine of that system. The last instruction of the sub-routine associated with the subsidiary control system at the first subsidiary storage level is then arranged to transfer machine operation to the second level subsidiary control system which is thereupon allowed to operate for the length of time which still remains of the assigned first sub-routine control period. At the end of this particular time period control is again reverted to the first subsidiary control system or to the main machine control and further attention to the transfer sequence of the second subsidiary control system is postponed until the next following use is made of the first subsidiary control register when again the surplus time alloted to the performance of the sub-routine programme in such first subsidiary control system is used to continue with the sub-routine order sequence of the second sub-control system.

In order that the nature of the invention may be better understood, certain embodiments thereof will now be described with reference to the accompanying drawings, in which.

Figure 1:
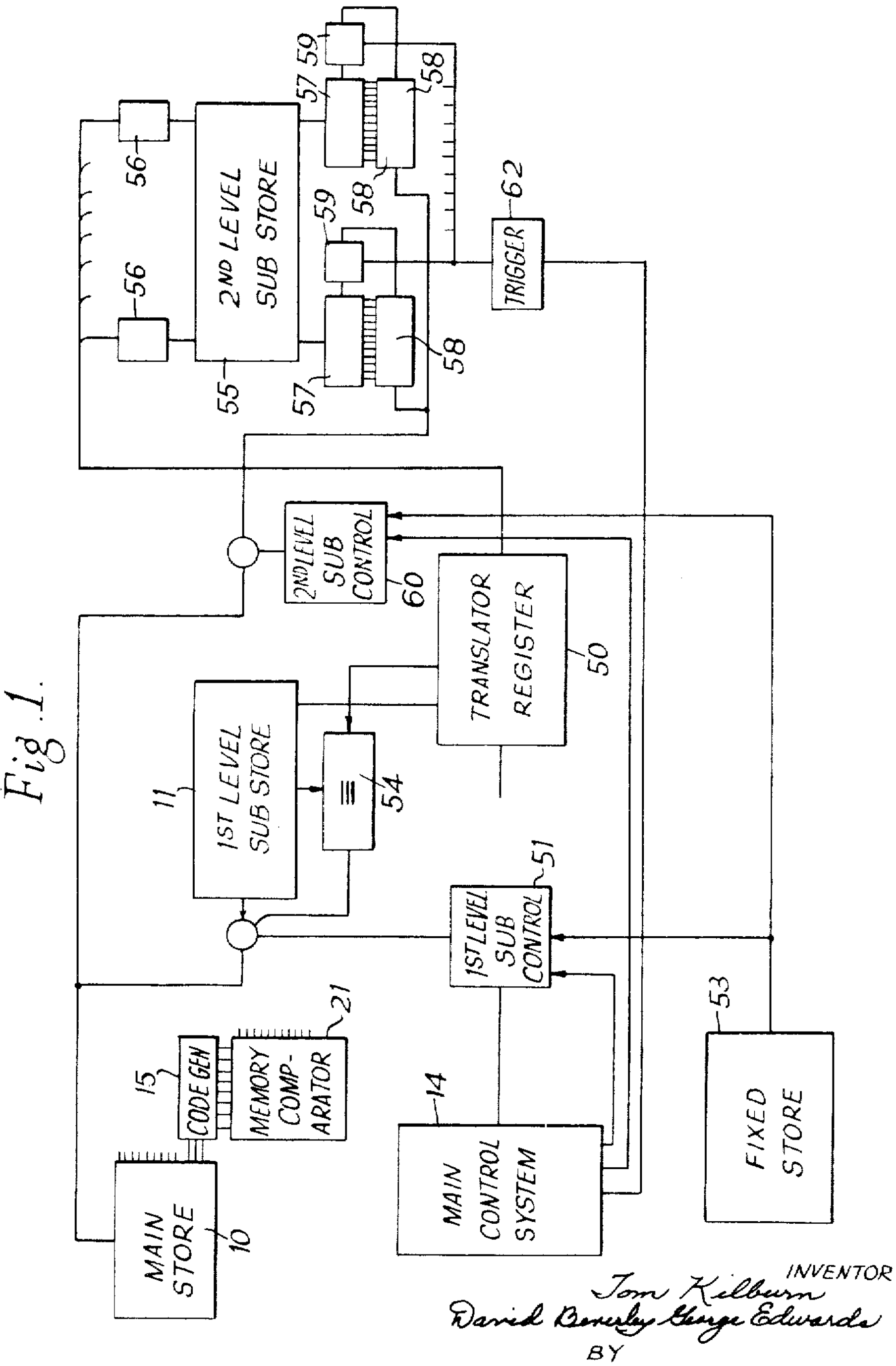
FIGURE 1 is a block schematic diagram illustrating the principal components of an electronic digital computing machine embodying one form of the present invention.

In the embodiment shown schematically in FIG. 1, the main or computing store 10 comprises a plurality of magnetic core storage matrices arranged to provide immediately accessible storage locations for, say, 8192 data words as sixteen blocks of 512 words each. Selection of any particular one of the 512 positions in each block is effected by means of nine digits of the address section of an order signal applied to the normal control system of the machine, shown schematically as block symbol 14. Selection of the required one of the sixteen storage blocks is effected by means of a further eleven digits of the same order signal in a manner described in greater detail in the co-pending Killburn et al. applications Serial Nos. 95,379, filed March 13, 1961, and 103,785 filed March 18, 1961, and involving the use of a memory comparator circuit 21 and an associated four-digit signal generator 15 whose output signals are those actually effective to select one of the sixteen storage blocks in the main store 10.

Briefly, the memory comparator circuit 21 registers sixteen order signal block address (eleven digit) numbers and allows each of these to be compared with the eleven block address digits of an order signal in the control system 14. If one of the registered block address numbers coincides with the form of the block address digits of the applied order signal, the related section of the generator 15 releases a code signal to the main store 10 which renders the particular one of the sixteen blocks containing the block identified by the eleven order digits accessible for carrying out the particular function signalled by the function digits of the same order. If, on the hand, the particular block called for by the said eleven digits of the order is not, at the time, within the main store 10 then the resultant lack of coincidence within the comparator circuit 21 initiates automatic action by the machine to find the required block in the subsidiary storage space provided and then to transfer such block into one of the block spaces of the store 10.

The subsidiary storage capacity provided comprises a first level of storage in the form of one or more magnetic storage drums 11 capable of providing storage locations for a number of blocks of 512 data words each. Each block storage space in the drum store 11 has associated therewith means for signalling an identification or block address number immediately prior to the time when such block of 512 word storage locations becomes accessible.

In a manner similar to that explained in said copending application Serial No. 103,785 filed April 18, 1961, a directory in the form of a translator register 50 is provided for maintaining a continuous record of where, in the drum store 11, each of the different 512 word blocks is located. Such translator register is arranged to be responsive to the eleven-digit address signal section of an operative order signal and to provide an output signal indicative of the actual drum store location for matching with the successive drum address signals being continuously provided from the drum store in a coincidence detecting circuit 54. During transfer, the detection of coincidence in the circuit 54 allows the desired transfer to commence.

As explained in greater detail in the aforesaid copending application Serial No. 95,379 the transfer operation involves a considerable number of other machine operations including those of deciding which 512 word block storage space in the main store 10 is to be cleared for receiving the new block, then the clearing of such block by transferring it to the drum store 11, recording in the register transulator circuit 50, where such cleared block is now located and then proceeding with the actual transfer when the block storage location in the drum store 11 becomes accessible.

Instead of providing a series of appropriate orders to achieve these different transfer steps within the main order programme, this embodiment of the present invention provides for the temporary transfer of machine control from the normal control system 14 to a special first level transfer sub-control system 51, the currently operative order within the system 14 normally remaining there but being held suspended until after completion of the transfer. Certain types of currently operative order can, however, continue to be dealt with by interleaving with operative steps of the transfer operation when this does not demand continuous and uninterrupted use of the main data store and/or the associated circuits.

This sub-control system 51 includes a stepping control register for selecting in turn each of a group of special orders designed and arranged to carry out the complete transfer cycle. These orders are stored as a separate group of words at sequential addresses in a further core storage device 53 of the pre-settable or fixed type. The register of the system 51 is arranged to be set, prior to the commencement of each transfer cycle, with the address number of the first of such transfer order group so that when transfer of control occurs each of the different orders of the said transfer order group held in the store 53 are worked through in turn, the first order being obtained fom the fixed store 53 by means of the initial pre-setting of the register in the sub-control system 51 and the remaining orders being obtained in turn from the same fixed store 53 by the progressive stepping on of such register of the system 51 in the usual way.

The actual form of the sub-control programme can be altered at will merely by inserting appropriately different orders in the operative series of address locations of the fixed store 53. Such programme can be designed to deal with a wide variety of operation conditions. For example, it can include a special analytical programme for deciding which of the sixteen 512-word storage blocks of the main store 10 is the best one to clear in view of the particular type of problem involved as described, for instance, in the copending Killburn et al. application Serial No. 103,786 filed April 18, 1961.

The actual transfer of the successive words of a chosen block in the main store 10 to the drum store 11 or vice versa may be controlled by a part of the above- mentioned transfer order group. Such programme control arrangement is probably desirable when the drum signalling speed is different from that of the main data store. When the two stores have speeds of the same order, the use of a separate transfer programme to control transfer is unnecessary, the transfer once initiated being then automatic.

In order still further to increase the data word storage capacity of the machine, further or second level storage 55 is provided in the form, for instance, of a group of 16 magnetic storage tape decks. In addition to having an even lower speed of access than the drum store 11, such tape decks have a much lower signalling speed than either the main store 10 or the drum store 11.

This second level storage is arranged to transfer data to and fro between itself and the main store 10. Such transfer may be effected in much larger groups consisting each of, say, sixteen 512 word blocks, these larger groups being identifiable by the five most significant digits of any address signal section of an order signal. The particular location of any one of these groups is also recorded in the directory or translator register 50.

In the event of a particular 512 word block required by the operative order signal being found not to be present in the main store 10 or in the first level drum store 11, the machine is arranged then to proceed with the automatic transfer of such block to the main store 10 or the 8192-word group containing such block from the second level storage to the first level sub-storage by way of the main store 10.

To control such transfer operations between the main store 10 and the second and first level storage, a further or second sub-control system 60 is provided and may be arranged in similar manner to the first sub-control system 51 to work through a predetermined programme or sub-routine of special orders designed to carry out the different steps of finding where the required group is located in the different tape decks, searching the particular tape deck to find the wanted group and then effecting the necessary transfer. As in the case of transfers between main and first level storage, the drum store 11 will need to have an 8192 group storage space therein cleared to the second level storage to make room for the opposite direction transfer of the required new group. This clearance, as well as the decision as to which drum store group space is to be cleared, is arranged to be effected under the control of the sequence of orders applied to the second sub-control system 60.

Each tape deck of the second level storage 55 is provided with means 56 for searching for a particular group marker signal also recorded on the record tape for indicating each separate group storage position. Such means include coincidence testing means which may operate temporarily to arrest tape movement when the required group storage position is found. Reading from the tape in each tape deck is arranged to occur, digit by digit, into a stepping register 57 which may have a total digit capacity equal to one, two or even more data words. Associated with each of such registers 57 is a second register 58 connected in parallel to the first and so arranged that, immediately the associated first register is full, i.e. has been supplied with its full complement of digit signals, the signal state of each digit stage thereof is instantaneously transferred to the interconnected stage of the second register and the first register 57 thereafter immediately cleared in readiness to receive further digit signals from the tape deck.

The above signal transfer from first to second registers is accompanied by the emission of a signal to an associated flip-flop 59, which remains triggered until the second register is read out and reset to zero. The outputs from each of the flip-flops 59 are applied in parallel as a triggering input to a further mono-stable trigger circuit 62 whose "on" period following triggering is arranged to be slightly less than the total time period required for reading one data word from the tape into the first register 57.

The sub-routine associated with the second sub-control system 60 is arranged to require, at most, a period rather less than that of the aforesaid word-read period from the tape to register 57 and contains 16 separate sections each dealing in turn with the 16 successive tape decks. When the flip-flop 59 associated with a particular tape deck is not set "on," the related section of the sub-routine is passed over so that, under operation conditions when only one or two tape decks are involved at any one time, the major part of the sub-routine time period is not required for active use.

The setting "on" of the trigger circuit 62 is arranged to cause the transmission of a signal to the main control system 14 and to the first level sub-control system 51. This signal has the effect of suspending operation in the operative one of such control systems after completing the particular operation cycle in progress at the time and then effecting transfer of control to the second level sub-control 60. This immediately works through its own sub-routine, passing over each non-operative tape deck in turn and effecting reading of each filled second register 58 at the high drum signalling speed into the appropriate main store storage space.

The first level subsidiary control 51 is preferably arranged to be operative, after being brought into use, for a period of time somewhat longer than that necessary to work through the whole of the series of instructions in its particular sub-routine. The last instruction of such sub-routine is then arranged to cause transfer of machine control to the second level subsidiary control for the remainder of such assigned period of time to proceed with any necessary operations called for by the second level of subsidiary storage. In this way, transfers between the main store 10 and the first level or drum store 11 and between such main store 10 and the second level or tape store 55 can take place with an overall coincidence by interleaving of the successive word transfer steps in each. Control then alternates between the first level sub-control 51 and the second level sub-control 60.

In the majority of instances, a major part of the second level sub-routine time period will be superfluous and by the insertion of an appropriate final order in the second level sub-routine, machine control is returned to the previously operative normal or first level control system.

Similar arrangements are provided for writing into the tape decks while the scheme may be extended in broadly similar manner to a third level of equipment such as output printers and other peripheral equipment which has even slower speed of access and correspondingly slower signalling speed.

The further embodiment of the invention shown in FIGS. 2–6 is, like that of FIG. 1, a machine arranged for operation in the parallel mode and with binary form numbers. Accordingly, where reference is made to a "multiple," such term is to be construed as meaning a group of separate conductors, one for each signalled digit value, while reference to "gate means" in association with such multiples is intended to mean the control by gate circuits of all of the separate digit leads of the multiple by means of one or more control signals. Such multiples or conductor groups are shown in the drawing only as a single line while, in the interest of clarity, the various gate control signal connections and other elements have largely been omitted since their construction and arrangement follows the now well known forms and practices of the art.

This further embodiment resembles that described in the aforesaid copending applications and is one in which each word storage location available in the main or secondary storage is assigned a unique address identification. The machine comprises a main store 10 which is conveniently of magnetic core matrix form similar to that described in connection with the first embodiment and providing immediate and random access to 8192 word locations arranged as 16 blocks of 512 words each. Work selection within the main store 10 is by associated address select means 12, e.g. of diode tree form, operated by word and block digit signals on multiples 22, 23 fed through a priority control circuit 39. The main store output multiple is shown at 24 and the main store input multiple at 25. Directly associated with this main store 10 are the usual computing circuits 18 connected to the multiples 24, 25 through the usual gate means.

The embodiment includes secondary storage in the form of a magnetic drum store 11 with its associated address selection and signalling means 16. Control of the block address selecting means 16 is by way of multiple 41 while multiples 42, 43 are those over which address identifying signals are provided from the drum store 11 whilst a transfer operation is in progress. The input multiple of the drum store is shown at 46 and the output multiple at 47. Arrangements similar to those described in the aforesaid copending applications are included for effecting automatic transfer of blocks of data words to the main store in the event that a data word currently required is not already in such store. Since such automatic transfer control arrangements form no part of the present invention, they have been omitted from the drawing in the interest of clarity apart from indication of the block code signal translator means 21 which correspond to the memory comparator circuits and the code signal generator of such copending applications.

The arrangements shown also include further word storage in the form of a number of magnetic tape decks shown at 55 with associated address selection and signalling means 61. The input multiple for controlling address selection is shown at 63 while multiples 64, 65 carry output signals identifying the particular storage positions which are available at any moment during a transfer operation. The input multiple to the tape decks 55 is shown at 66 and the output multiple at 67.

In addition to the aforesaid drum store 11 and tape deck 55, the machine is also provided with a number of separate peripheral equipments 72, such as punched card readers, card punchers, teletype machines, random number generator, timing clock and the like. Each of these equipments may require access to the main store 10 and/or to the control system of the machine and are accordingly suitably connected to one or both of the multiples 24, 25, through suitable gate means. Each peripheral equipment 72 is provided with means such as a trigger circuit and an associated output signal lead 90 which becomes energised whenever the particular peripheral equipment requires access to the main store 10 or the control system. In a manner as described in greater detail later, each of these signal leads 90 is coupled to an interrupt trigger circuit 93 which becomes set on whenever any lead 90 is energised. Such trigger circuit 93 is also supplied with a triggering input from a number of other equipments including the drum store 11 over start signal lead 68 and the tape decks 55 over start signal lead 69 whenever these need access to the main store. Such interrupt trigger 93 is also arranged to be triggered on in the event of certain particular machine conditions such as faults, overflow, tape failures and by error indicating signals and the like. Such alternative inputs are not shown but their form can be easily understood from those which are shown and described.

The machine arrangements shown also include a normal control register 80, and an instruction register 14 having the usual main and modifier word inputs and providing the usual word, block, modifier and function identifying outputs. In addition to the normal control register 80 there is provided an extra-code control register 81 which can be set by way of multiple 32 and which provides signals over multiple 33 to control the address selection means 35 of an extra-code instruction store 34 having an output multiple 36.

The arrangements further include another alternative control register, the interrupt control register 82 having an input multiple 83 supplied by way of any one of a number of gate means 96 with suitable numbers in the form of setting voltages applied to predetermined and mutually different combinations of the trigger circuits or like elements which constitute such interrupt control register. Output signals from this control register are applied over multiple 84 to operate address select means 37 of an interrupt instruction storage device 38 within which is located a special interrupt instruction programme.

The machine also includes other conventional elements including waveform generating and timing means. As these follow the usual form for parallel type machines, they are neither illustrated nor described.

Although shown as separate units, certain of the storage devices such as the elements 28, 34, 38 can be a common storage device such as a core storage matrix.

Figure 3:
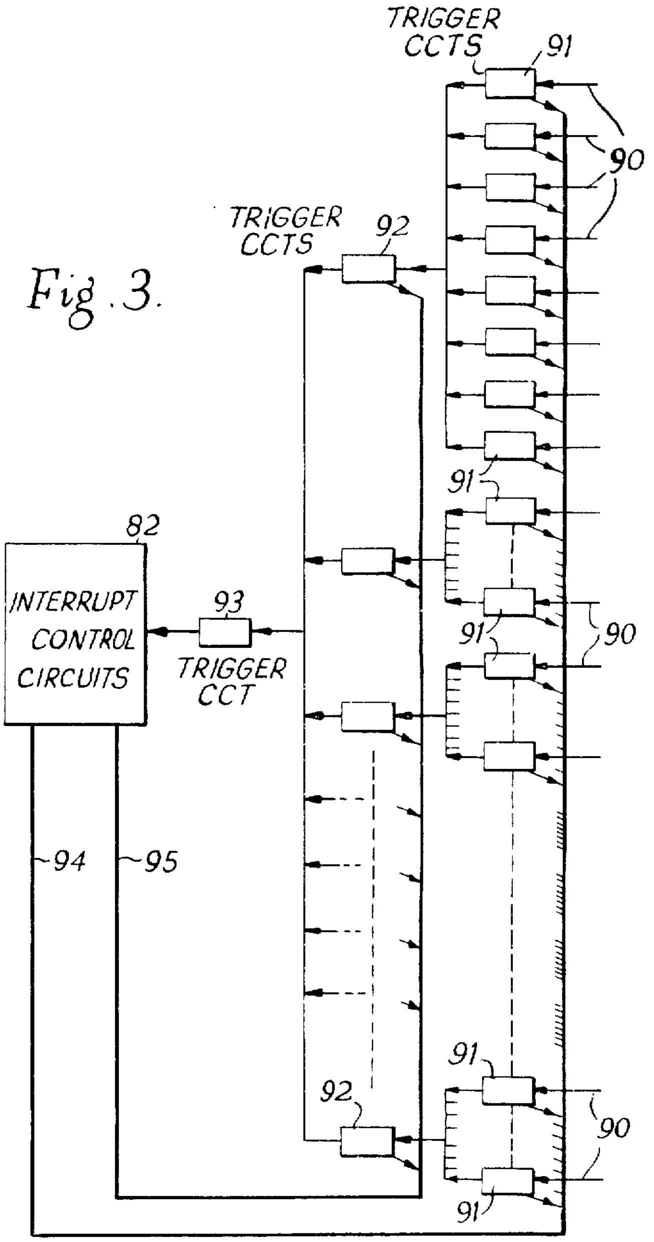
FIGURES 3 to 6 are more detailed block schematic diagrams illustrating certain parts of the machine shown in FIG. 2.

One manner of providing and assigning the appropriate priority of attention to the various interrupt signals is indicated in FIGURE 3. Each of the possible sources of an interrupt signal, shown as leads 90 from the different sources, has an associated trigger circuit 91 which is triggered "on" when access to the main machine circuits is required. The various trigger circuits are arranged in groups of eight, the triggering "on" of any circuit 91 of the first group also causing triggering "on" of a further related single trigger circuit 92 associated with that group. Each of the other groups of eight trigger circuits 91 has a similar common trigger circuit 92 which is set "on" when any of the trigger circuits of the particular group is set "on." The triggering "on" of any of the further trigger circuits 92 causes triggering "on" of the final interrupt trigger circuit 93 whose output, when so triggered, constitutes the final interrupt signal for application to the interrupt control system. As described later, the presence of such an interrupt control signal causes cessation of the normal machine operation under the control of the normal control register 80 after completion of the particular current instruction present therein followed by diversion of machine control to the interrupt control register 82.

The interrupt control register 82 is arranged to have access to a series of different instructions related respectively to the nature of the operation needed to deal with the equipment demanding access. Such instructions are held in the store 38 (FIG. 2) which may be of the fixed or slug type of magnetic core store and the selection of the appropriate one or the first of an appropriate group of instructions by the interrupt control is effected by the setting up of a suitable address signal in the register 82 by mean of the different output signals available from the different trigger circuits 91, 92 which have been triggered "on" and applied over leads 94, 95. The sense circuits 40 of the interrupt control are arranged to search first for the particular source or sources of initial interrupt signals according to a predetermined priority sequence so that in the event of several equipments demanding access simultaneously, that which is least capable of waiting is dealt with first.

Equipments, such as tape decks, whose signalling speeds are low relatively to that of the main machine circuits have associated therewith coupled register systems similar to those including elements 57, 58 and 59 in FIG. 1 whereby rapid read-out or write-in may be effected with relatively slow digit-by-digit distribution or assemblage within the slower speed equipment itself.

The magnetic drum store 11 and the tape decks 55 have their own control registers capable of providing address signals for effecting information transfer between themselves and the main store 10 and accordingly require entry into the interrupt control only to initiate a transfer operation. Thereafter such control registers supply their address signals at appropriate times on an automatic basis to effect transfer of a word or a pair of words as such word are assembled in the associated register system, the intervening periods being available for normal machine operation, e.g. under the main control 80. The magnetic drum store 11 and a plurality of the tape decks 55 can be engaged in transfers simultaneously with interleaved periods of normal machine operation.

In view of such simultaneous operation, it is possible for three address requests to be made simultaneously, namely from the main machine control and intruction registers 80 and 14, from the drum store 11 and from the tape decks 55. In this event, these requests are dealt with in the priority order of drum store, tape decks and machine control.

Figure 4:
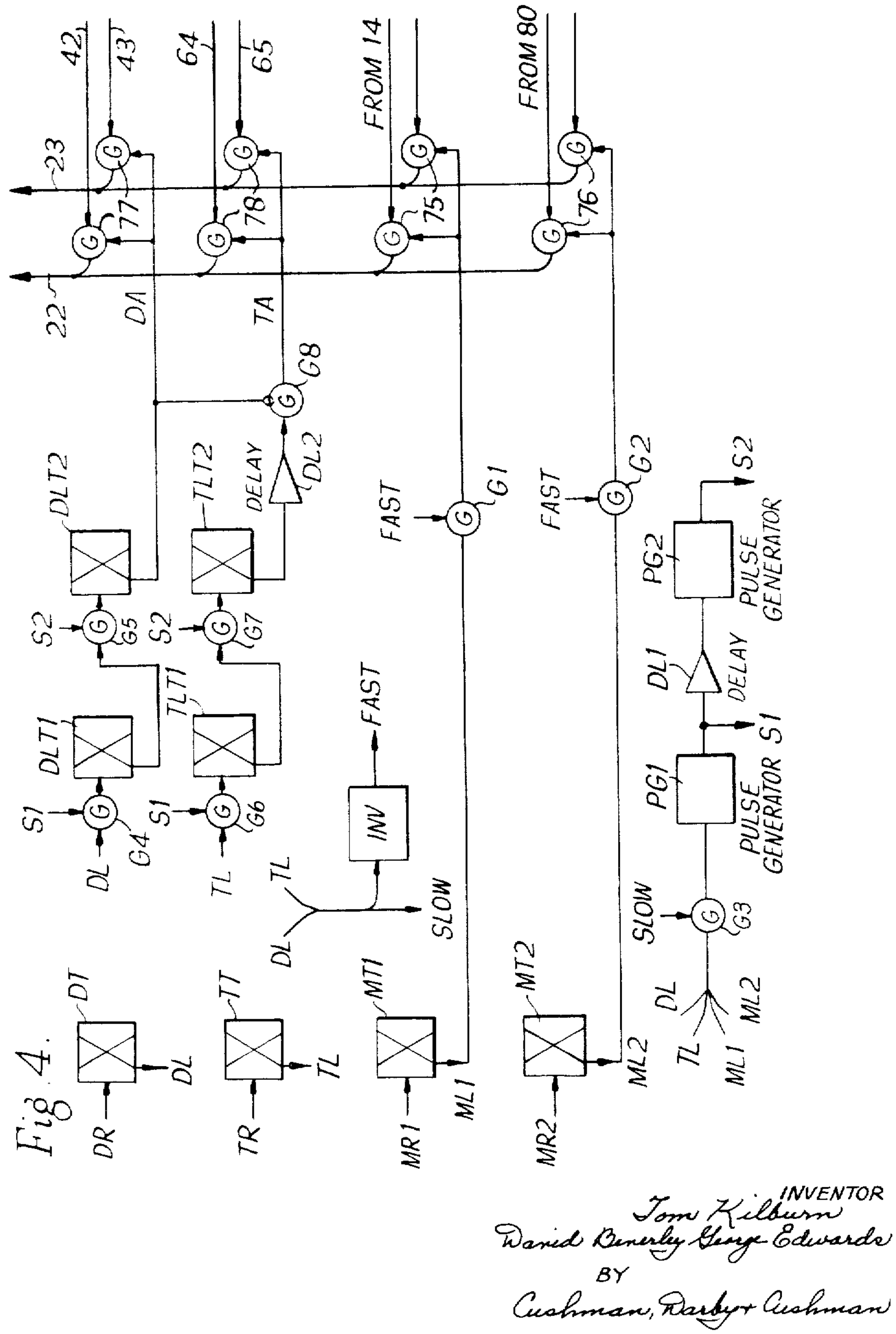

The arrangements of the priority control circuits 39 used for achieving such priority allocation are illustrated in FIG. 4. As described later, at the instant when the drum store 11 is ready to effect a transfer operation it emits a start request signal DR over lead 70 to the priority control while, in like manner, the tape decks 55 each emit a similar request signal TR over lead 71. The control register 80 includes means, such as a gate opened at each instant of the machine cycle when the register is about to be read, for providing a similar request signal MR2 over lead 73 while the instruction register 14 in like manner provides a request signal MR1 at each instant when it is about to be read. The respective signals DR, TR, MR1 and MR2 are applied as triggering inputs to separate trigger circuits DT, TT, MT1 or MT2 providing signal outputs DL, TL, ML1 and ML2 respectively. If no transfer operations involving the drum store 11 or the tape decks 55 are already in existence, the outputs ML1 or ML2 alone are able to open gate means 75 or 76 to permit the selection of addresses in the main store 10 from the registers 14 or 80, such gate means being controlled through the "AND" gates G1 or G2 themselves controlled by the FAST waveform which is then active.

Immediately prior to an actual tape deck or drum store transfer, the aforesaid request signals DR or TR are provided and the aforesaid gates G1 and G2 are closed by the absence of the active FAST waveform and other gates controlled by the SLOW waveform are opened. Thereafter, by a timing system provided by the sequential pulses S1 and S2 generated through gate G3, pulse generators PG1, PG2 and delay circuit DL1, the priority system operates to open gate means 77 to allow the drum address signals to pass to the multiples 22, 23 and to prevent passage of the tape deck address signals through gate means 78 in the event that requests from both drum and tape decks occur simultaneously. The DL output is applied through gate G4 controlled by the S1 waveform to set a trigger circuit DLT1 whose output is then applied through a gate G5 controlled by the S2 pulses to set a second trigger circuit DLT2 whose output goes to the aforementioned gates 77 as the drum address control signal DA. Similarly, the tape deck trigger output TL, when it occurs, is applied through a gate G6, which is controlled by the S1 pulses, to set a trigger circuit TLT1, and the output thereof is then applied through a further gate G7 controlled by the S2 waveform to set a further trigger circuit TLT2 whose output, after passage through a delay circuit DL2 and a further gate G8 which is inhibited if the drum address signal DA is present, forms the tape address control signal TA whereby the tape address signals on lines 64 and 65 may pass through gates 78.

Figures 5, 5A:
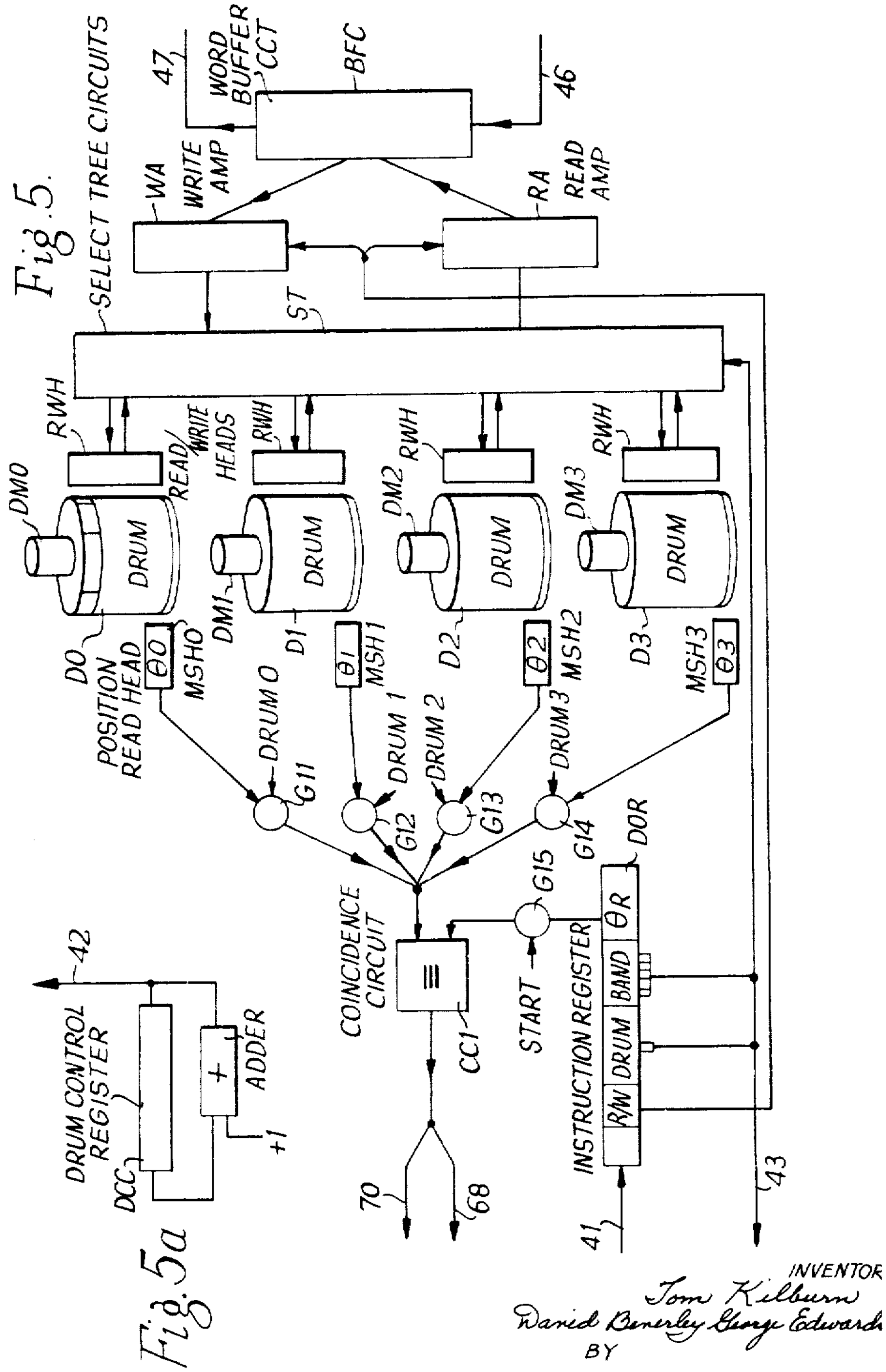

The arrangements of the drum store 11 are shown schematically in FIG. 5 and comprise four asynchonously running magnetic storage drums D0, D1, D2, D3 each driven at 5,000 r.p.m. by an individual electric motor DM0, DM1, DM2 and DM3. Each drum has eight bands of $n$ tracks, where $n$ is the number of digits in a word, operated in the parallel mode to contain $n$ digits per slot or channel. Each band contains 6 blocks of 512 $n$ digit words, each 512-word block position being marked by the emisison of an angular marker signal $\theta$ derived in known manner from a group of separate second tracks on each drum.

Associated with each band is a group of $n$ read/write heads RWH, the $n$ separate heads of any one of the 32 groups which deal respectively with the 32 available $n$-track bands being arranged for individual connection through a select tree circuit ST or similar selector switching circuit to $n$ write amplifiers WA or $n$ read amplifiers RA according to whether a write or read operation is being performed. A buffer circuit BFC is provided to receive $n$ digit signals in parallel from the main store 10 over multiple 46 or to transmit $n$ digit signals in parallel to such main store over multiple 47 at intervals of 4 microseconds, such buffer circuit being interconnected with the read and write amplifiers so as to receive readout signals from the operative drum band or to transmit write-in signals to such band.

The angular position marker signals $\theta 0$–$\theta 3$ from the respective drums D0 . . . D3 are each made available from a marker signal read head MSH0, MSH1, MSH2, MSH3 associated respectively with the drums D0, D1, D2 and D3. These signals are fed through separate gates G11, G12, G13, G14 each controlled by an appropriate drum select signal DRUM0 . . . DRUM3 to one input of a coincidence circuit CC1, the other input of which is supplied by way of a control gate G15 from a section of an associated drum order register DOR which registers an operative transfer order fed over multiple 41 from the main machine circuits and identifying the required drum, the required band of such drum, the angular position $\theta$ of the required block in that band as well as a read/write control function signal. Signals derived from the band and drum identifying sections of such register control the select tree circuit ST while signals from the drum identifying section also control the gates G11 . . . G14. Signals from the read/write function section control the operation or non-operation of the read and write amplifiers RA, WA and the associated read and write heads RWH. The output signal from the coincidence circuit CC1 available when the angular position signal $\theta$ from the selected drum matches the required angular position setting of the $\theta$R section of the order register DOR, provides the transfer start signal DR over leads 68 and 70. For the purpose of providing a series of word position signals to control the address selection means 12 of the main store 10 during a transfer operation whereby each word position within a chosen word block position of such main store is used in turn, a continuously changing address signal is provided by output signals taken from a drum control counter circuit DCC (FIG. 5*a*) whose count state is continuously increased by one at each word transfer to or from the buffer circuit BFC through signals derived from the selected operative drum through the associated marker signal head MSH0 from zero to 511 and is then reset to zero to mark off one complete word block. Such address signals are fed over multiple 42 through the priority control circuits as shown in FIG. 4, to the main store address selection means 12 in FIG. 2.

Figures 6, 6A:
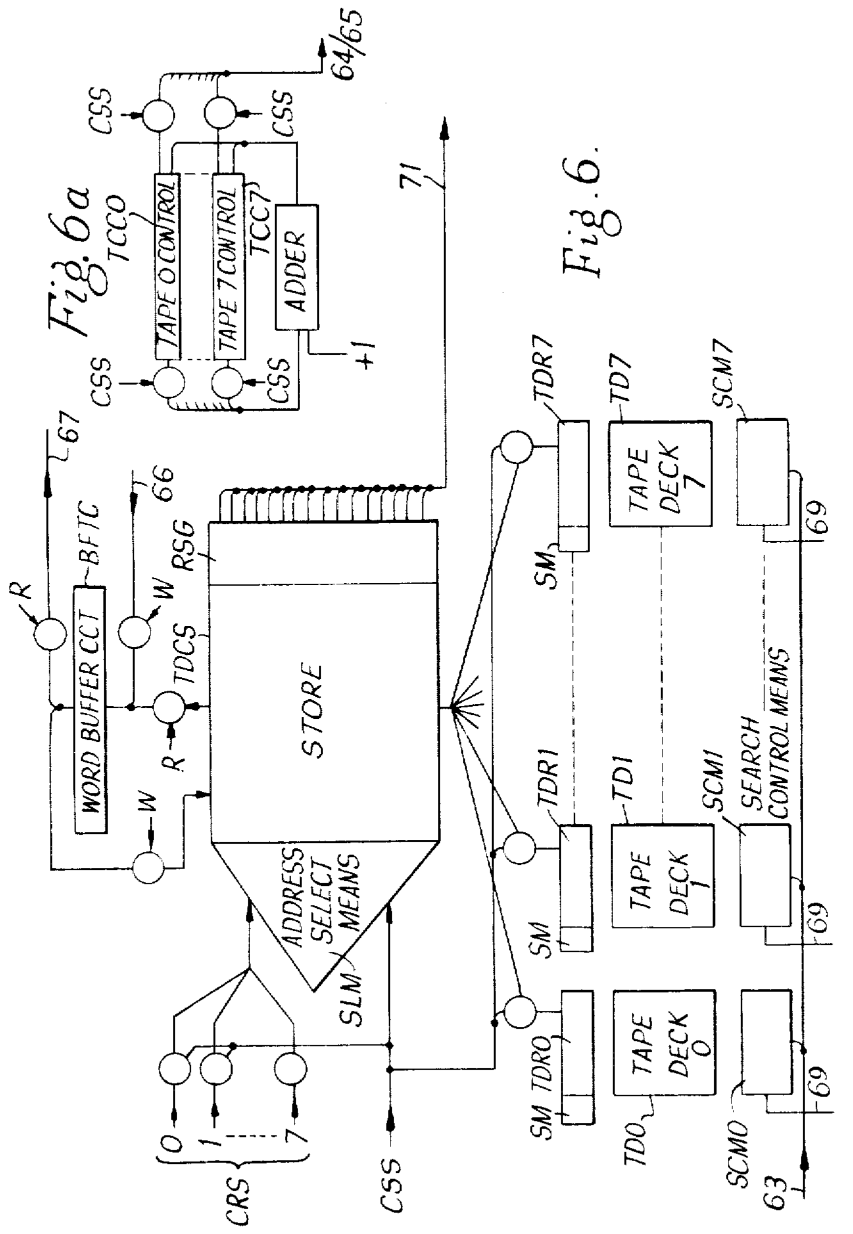

The arrangements of the tape deck storage 55 are shown in FIG. 6 and comprise a suitable number, e.g. eight separate tape decks TD0, TD1, TD2 . . . TD7, each capable of reading or writing 12 digits every 22 microseconds to or from an associated 12-bit register TDR0 . . . TDR7, each of which registers may comprise a group of trigger circuits and each of which also includes signal means SM such as a further trigger circuit which is set on when the register is full during reading or when it is empty during writing to indicate that it is ready for clearance or refilling as the case may be.

These registers are each interconnected by way of suitable multiples with a storage device TDCS, which may conveniently be a part of one of the core storage devices of the machine other than the main store. This storage device TDCS provides storage space for two 48-digit words for each of the tape decks, i.e. a total of sixteen 48-digit word locations, each of which is selectable by address select means SLM, such as a usual form of tree circuit, controlled by channel selection signals CSS and by a series of character selection signals CRS. These signals CSS and CRS are provided cyclically at predetermined regular intervals whereby the register TDR0 is connected to the first 12-digit storage elements of the first word storage for deck TD0 followed by the connection of register TDR1 to the similar 12-digit storage elements of the first word storage for deck TD1. The remaining decks are dealt with in turn before the register TDR0 is again connected, this time to the second 12-digit storage elements of the first word storage for deck TD0. The cycle is repeated until all elements of all first word storage positions have been dealt with whereafter the second word storage positions are dealt with in like manner.

A single word buffer circuit BFTC is associated with the storage device TDCS for holding one complete 48-digit word. This buffer circuit receives such complete word from the storage device after it has been assembled during a tape read operation, the instant of completion of such assembly being marked by the emission of a reference signal from the related one of sixteen signal elements RSG, e.g. trigger circuits associated, one with each of the eight two-word storage locations in the storage device. Such signals are fed over lead 71 to the priority control means 39 associated with the machine control as described above. Transfer to the main store 10 occurs as soon after such reference signal appears as the existing state of machine operation allows. Control of the main store address select means 12 to select the appropriate word positions in the chosen block is by signals provided by the related one of eight stepping registers TCC0 . . . TCC7 (FIG. 6*a*) which are basically similar to the single register DCC of the drum store arrangements, each being stepped on by one count step each time a word is transferred from the related tape deck. Transfer from the main store on line 66 to any tape deck is also through the buffer circuit BFTC and the storage device TDCS in analogous manner.

Each tape deck is also provided with the usual search control means SCM0, SCM1 . . . SCM7 by which, after application of a block address over multiple 63 from the normal instruction register 14, FIG. 2, the tape deck concerned is caused to operate to present the section thereof containing the required block to the read/write heads. When the block position demanded is found, an indication thereof is given by an interrupt signal on the related lead 69 to the interrupt control system.

The manner of operation of the arrangements shown in FIGS. 2–6 is briefly as follows. During normal machine operation in conjunction wtih a programme of computing instructions, the normal control register 80 records the address in the main store 10 of the next current instruction. This address is signalled over word and block digit multiples 22 and 23 and through the priority control circuits 39 to the address select means 12 of the main store 10. The required instruction word is then read out from the main store 10 over multiple 24 to the normal instruction register 14. Any "B" or modifier digits of this instruction are then signalled over multiple 26 to operate the address select means 27 of the "B" or modifier word store 28, the selected B-word being fed over multiple 29 to the normal instruction register 14 where it is combined in the usual way with the previously applied instruction word. The respective word and block address digits of this instruction are then fed through the priority control circuits 39 and multiples 22 and 23 to the address select means 12 of the main store 10 to select the operative data word; the function digits of the same instruction in the register 14 are applied to the function decoder 45 to control machine operation in the conventional manner.

Upon the completion of this operation cycle, the control number in the control register 80 is advanced by one in the usual way and the cycle of operations then repeated.

Under conditions of "extra-code" working, the current instruction fed from the main store 10 into the normal instruction register 14 is one containing a special digit configuration and the presence of such special digit configuration is detected in the extra-code sensing circuit 30 which thereupon provides control signals E which close the normal output paths from the control register 80 and inhibit its further alteration after advancing its count number by 1; such control signals also cause the transfer of the word and block address digits of the current instruction from the instruction register 14 by way of multiple 31 into the B-word store 28 at a particular address location reserved exclusively for extra-code working and selected by signals from the sensing circuit 30 applied to the address select means 27. The digits which normally constitute the function digits of the current instruction, in this case, constitute an address signal which is fed over multiple 32 into the extra-code control register 81. This address signal is then fed over multiple 33 from the extra-code control register 81 to operate the address select means 35 of the special extra-code instruction store 34 which holds a number of groups of instructions forming sub-routines for effecting special and usually complex operations. Such address signal selects the first of the group of instructions forming the required particular sub-routine. This instruction, in the form of a group of function digits and possibly B-digits also, is then fed from the stores 34 over multiple 36 into the normal instruction register 14 (which has meanwhile been cleared) while the address digits lodged in the aforesaid special location in the B-store 28 are likewise fed to such normal instruction register 14 to set up the first full instruction of the extra-code phase. This instruction is then used in the normal manner to control the selection of the required data word in the main store 10 and the operation performed therewith.

Upon the completion of the first extra-code instruction, the number held in the extra-code control register 81 is advanced by one in the conventional manner to select the next of the group of instructions forming the special sub-routine held in the extra-code instruction store 34, which instruction is then likewise fed to the normal instruction register 14 to cause the next operation of the sub-routine. Such manner of operation continues until the presence of another special digit in the last of the selected group of extra-code instructions fed from the extra-code instruction store 34 operates the extra-code sensing circuits 30 to terminate the extra-code operation cycle whereby the normal control register 80 is again brought into operation. Since the control number in such register was advanced by one after its previous use, it accordingly now causes resumption of machine operation at the next instruction of the normal programme.

The interrupt control system operates along somewhat similar lines to those of the above described extra-code control. Any current instruction concerned with the operation of any of the peripheral equipments 72 or a transfer between the main store 10 and the drum store 11 or a transfer between the main store 10 and one of the tape decks 55 is initially located in the normal instruction register 14. Under the control of the function digits of the instruction and, where necessary its address digits, the required operation of the peripheral equipment 72 or the drum store 11 or one of the tape decks 55 is initiated, e.g. to find and read a particular punched card or to print or punch out certain main store data or to find a specified block address in the drum or tape deck stores. Since the time interval between the original presentation of the instruction and the instant when the equipment concerned is ready to operate is very long compared with the machine operation cycle, the necessary control signals are sent to and registered in separate control registers associated with each individual equipment. In addition, however, the instruction is also registered in a particular storage position of the B-store 28 reserved for the particular equipment. In the interval time before the peripheral or other equipment is ready for operation, the normal machine programme is continued with successive instructions selected under the control of the normal control register 80.

Figure 2:
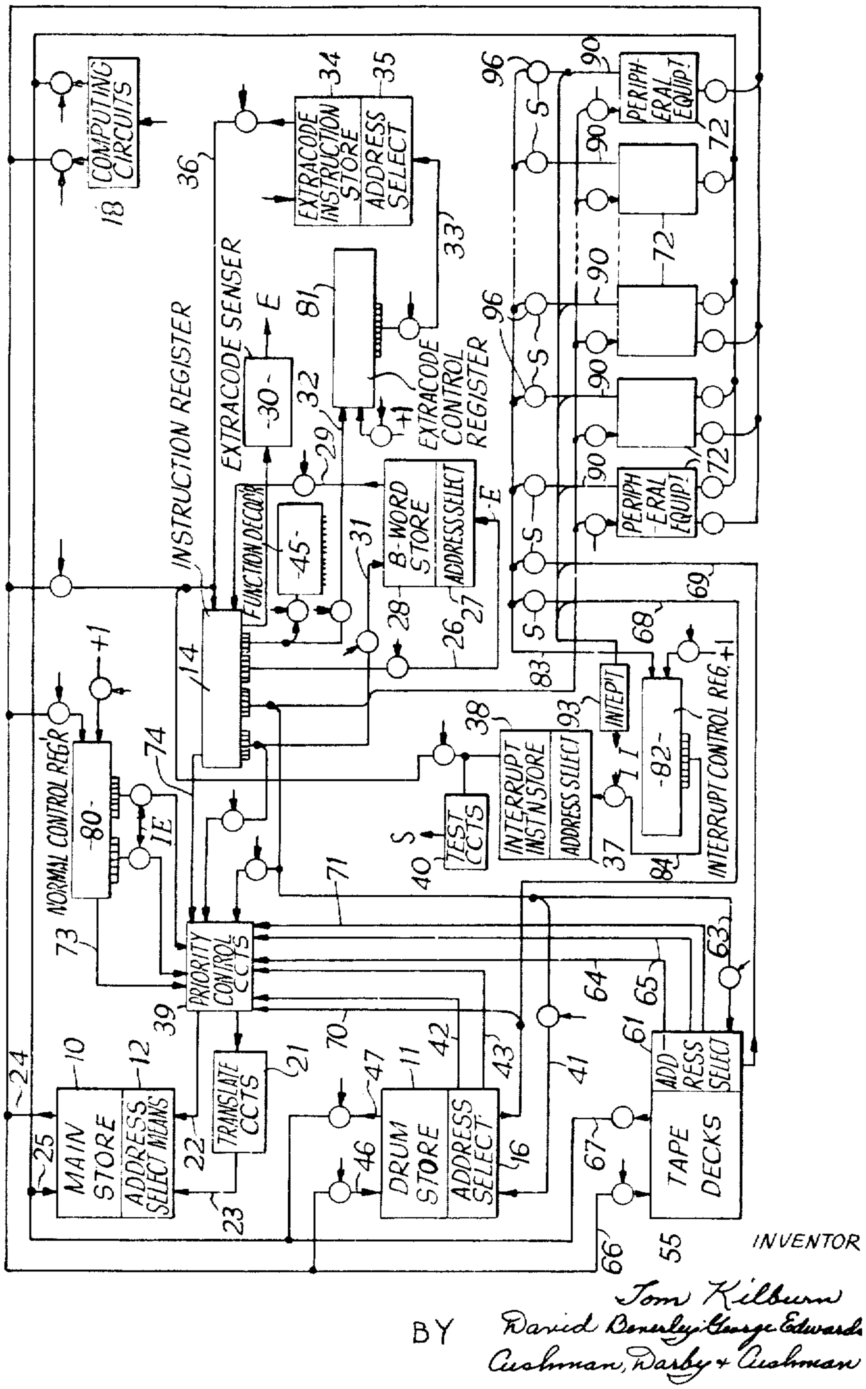
FIGURE 2 is a block schematic diagram illustrating the principal components of an electronic digital computing machine arranged in accordance with another and preferred embodiment of the invention.

When any of the peripheral equipments 72 or the drum store 11 or any of the tape decks 55 is ready for operation and requires access to the main store 10, it emits an individual demand signal upon its signal lead 90 to cause triggering on of the interrupt trigger circuit 93 to provide an interrupt signal I in FIG. 2. In a manner analogous to extra-code working this signal inhibits further operation of the control registers 80 and 81 and renders the interrupt control register 82 operative. The latter is always reset to a number which, when applied as a control signal to the address select means 37 of the interrupt instruction store 38, causes the selection of the first instruction of the interrupt programme.

The first group of instructions of the interrupt programme is concerned with the testing, as by the opening of a number of gate circuits in turn within the testing means 40, for activity of the various signal leads 90 according to a chosen priority as determined by the order of testing. Such testing instructions are selected in turn by progressively advancing the count state of the interrupt control register 82 in the usual way. Upon discovery of the first active signal lead 90, the related gate 96 is opened to apply a setting voltage to certain of the individual trigger circuits of the interrupt control register 82 whereby the latter is now set to a number which defines the particular instruction or the first of a group of instructions for dealing with the further operation of the peripheral equipment demanding access to the main store 10. The signals defining this number are then applied from the interrupt control register 82 to the address select means 37 of the interrupt instruction store 38 and the instruction concerned is then read out to the instruction register 14, the B-digits of such instruction serving to select the related storage position in the B-word store 28 where the particular address digits of the original instruction have meanwhile been held. Machine operation to deal with the peripheral equipment now takes place in normal manner, subject to any priority imposed by the priority control circuits 39. The last instruction of each group within the interrupt instruction store 38 causes reversion of the interrupt control register 82 to its initial setting whereby the search routine is again effected if the interrupt trigger circuit 93 is still set on owing to a further demand by other peripheral equipment.

In the case of the drum store 11, this likewise emits an interrupt signal on its lead 68 when the specified block location has been found and is ready for a transfer operation. In this case, however, the address digits concerned have been registered in register means within the circuits 16 and a continually changing word address signal is provided at timed intervals as the successive word storage locations on the operative drum become available.

These are fed to the address select means 12 through the priority control circuits 39 so that, once initiated through the interrupt control system, a drum transfer operation becomes automatic and does not require use of the interrupt control system for each individual word transfer step.

In similar manner, the tape decks 55 also provide individuals interrupt signals on the leads 69 to permit initiation of a transfer operation therewith but also include registers which provide address signals for operating the main store address select means through the priority control circuits 39. The operation during tape deck transfer is analogous to that of the drum store 11.

By suitable arrangement of the order of testing the various interrupt input leads 90, 68 and 69 any desired priority may be allocated to the different peripheral equipments requiring access to the main store while such equipments can be added to or changed without alteration of the machine circuits by addition to or alteration of the individual sub-routines of interrupt instructions registered in the store 38.

We claim:

1. In combination, a data handling system controlled by a plurality of stored manifestations for producing a normal sequence of operation of said system and including a plurality of stores one for each of a plurality of subsidiary devices, an interrupt facility for interrupting said normal sequence of operation, said interrupt facility including first means controlled by said plurality of subsidiary devices for producing, under control of any one of said plurality of subsidiary devices, an interrupt indication, means controlled selectively by each of said subsidiary devices for producing its own individual interrupt indication, means storing a program including means for initiating an interrupt, priority means controlled by said plurality of subsidiary devices for exclusively establishing an order of priority as between any two said subsidiary devices, means controlled by said first interrupt indication means for rendering said priority means operative, and selection means selectively controlled by said priority means for selecting from among said interrupt storage means the interrupt initiating program individual to each said subsidiary device, said priority means rendering one only of said selecting means operative whereby the interrupt program of the highest priority subsidiary device is rendered effective, first in sequence, followed by the next priority among said subsidiary devices.

2. An electrical data handling system comprising, main data storage means and a main control system for controlling machine operations in accordance with a principal program of machine instructions, a plurality of subsidiary control means for interrupting said principal program and initiating a new program, one for each of said plurality, separate means for storing an indication of interrupt, one for each of said subsidiary control means, a single means operative by any one of said subsidiary devices for indicating an interrupt demand by any of said subsidiary means, means for producing a sequential scanning of each of said separate interrupt indicator means, said means comprising a stored program determining the order of said sequential scanning and means controlled by said stored program for producing said scanning in accordance with the pre-established order of scan and means, controlled by said single interrupt means, for initiating the operation of said scanning means under the control of said stored program.

3. In an electronic digital data processing machine of tthe type which has a main store with associated address selection means normally under the control of a normal control register and a normal instruction register for controlling machine operation in accordance with a principal program of machine instructions, the improvement comprising a plurality of simultaneously but independently operable first means that require communication with said main store from time to time to transfer information therebetween, means for interconnecting said store with each of said first means to allow such communication when transfer is initiated, a plurality of lines extending respectively from said first means for carrying respective transfer ready signals, and an interrupt control system connected to said lines and responsive to said transfer ready signals for interrupting operation of said normal control register to cause communication between the main store and one of the said first means that is providing a said transfer ready signal, said control system including adjustable priority assigning means for determining the order in which said lines are to be checked for the presence of said transfer ready signals and means for so checking said lines to determine which of said ready first means is to be first in that order to communicate with the said main store.

4. In an electronic digital data processing machine of the type which has a main store with associated address selection means normally under the control of a normal control register and a normal instruction register for controlling machine operation in accordance with a principal program of machine instructions, the improvement comprising a plurality of simultaneously but independently operable first means that require communication with said main store from time to time to transfer information therebetween, means for interconnecting said store with each of said first means to allow such communication when transfer is initiated, a plurality of lines extending respectively from said first means for carrying respective transfer ready signals, and an interrupt control system connected to said lines and responsive to said transfer ready signals for interrupting operation of said normal control register to cause communication between the main store and one of the said first means that is providing a said transfer ready signal, said control system including an interrupt instruction store connected to said normal instruction register and testing means for storing instructions as to the order in which said means should be tested to determine, upon receipt of ready signals by the interrupt control system, which one of the ready first means is to be first in that order, as far as said instructions are concerned, to communicate with the said main store.

5. A processing machine as in claim 4 and further including at least one subsidiary storage means requiring communication with said main store from time to time to transfer information therebetween and having a transfer ready signal output line, and priority control circuit means connected to that output line and to said instruction register for determining priority of operation of the machine as between said storage and first means.

6. A processing machine as in claim 5 and further including a second and different type subsidiary storage means which also requires communication with said main store from time to time to transfer information therebetween and which has a respective transfer ready signal output line connected to said priority control circuit means for determination thereby of the priority of operation of said machine as between said first means and each of said storage means.

7. An electronic digital data processing machine comprising means including a main store, address selection means therefor, a normal control register, and a normal instruction register, for controlling machine operation in accordance with the principle program of machine instructions, drum storage means, address selection means for said drum storage means, a plurality of tape storage means and address selection means therefore, a plurality of peripheral equipments, means interconnecting said main store with each of said drum storage means, tape storage means, and peripheral equipments for two-way transfer of data therebetween, priority control circuit means having inputs from said drum storage means from said tape storage means, and from said registers for effecting priority of access thereof to said main store and its address selection means in the order named, an interrupt control system connected to said drum storage means, tape storage means, and peripheral equipments for interrupting operation of said normal control register to cause communication between the main store and one of the said storage means and peripheral equipments, each of said drum and tape storage means and peripheral equipments having a respective output line for providing a transfer ready signal when communication with said main store is desired, said control system including an interrupt trigger circuit which is connected to each of said lines for indicating when any one thereof carries a respective transfer ready signal, said trigger circuit being connected to disable said normal control register and advance its condition for properly resuming control after the interrupt control system releases control an interrupt control register, an interrupt instructions store operated through said interrupt control register in response to an output from said trigger circuit for providing signals indicating instructions for predetermining the order in which the said output lines are to be checked for the presence of said transfer ready signals, and test circuit means connected to receive said instruction signals for so checking the said lines to determine which of the peripheral equipments is to be first in that order to communicate with the said main store, said interrupt instruction store being connected to said normal instruction register for operation therethrough to provide instructions for the main store address selection means.

References Cited by the Examiner

UNITED STATES PATENTS

| | | | |
|---|---|---|---|
| 2,969,522 | 1/61 | Crosby | 340—172.5 |
| 3,029,414 | 4/62 | Schrimpf | 340—172.5 |

OTHER REFERENCES

Pages 33 to 36, 3/56, Publication I: National Bureau of Standards, Tech. News Bulletin, vol. 4, No. 3.

Pages 313 to 335, 7/59, Lewis, Watz, Smith, Weinberger, Journal of the Association for Computer Machinery: "Pilot—A New Multiple Computer System," vol. 6, No. 3.

References Cited by the Applicant

UNITED STATES PATENTS

| | | |
|---|---|---|
| 3,017,092 | 1/62 | Rent et al. |
| 3,048,332 | 8/62 | Brooks et al. |
| 3,079,082 | 2/63 | Scholten et al. |

MALCOLM A. MORRISON, *Primary Examiner.*